J. W. HUNTER.
COMBINATION LOCK.
APPLICATION FILED NOV. 11, 1909.

961,236.

Patented June 14, 1910.

2 SHEETS—SHEET 1.

Witnesses,
S. P. Buck.
C. N. Woodward.

Inventor
James W. Hunter
By
Attorneys.

J. W. HUNTER.
COMBINATION LOCK.
APPLICATION FILED NOV. 11, 1909.
961,236.
Patented June 14, 1910.
2 SHEETS—SHEET 2.
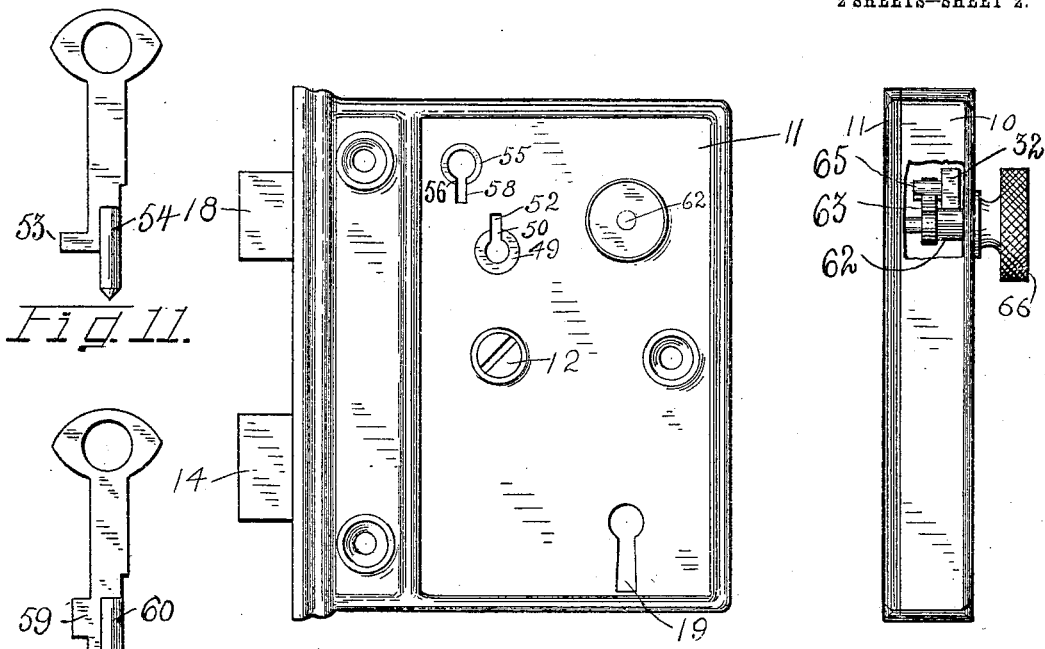
Witnesses
S. P. Buck.
C. H. Woodward.
Inventor
James W. Hunter.
By
Attorneys.

UNITED STATES PATENT OFFICE.

JAMES W. HUNTER, OF FOSTER, WEST VIRGINIA.

COMBINATION-LOCK.

961,236.  Specification of Letters Patent.  Patented June 14, 1910.

Application filed November 11, 1909. Serial No. 527,412.

*To all whom it may concern:*

Be it known that I, JAMES W. HUNTER, a citizen of the United States, residing at Foster, in the county of Boone, State of West Virginia, have invented certain new and useful Improvements in Combination-Locks; and I do hereby declare the following to be a full, clear, and exact description of the invention, such as will enable others skilled in the art to which it appertains to make and use the same.

This invention relates to locks, more particularly to the class of combination locks which may be employed for securing doors, cabinets or other structures, and may also be adapted for locking trunks, chests and like closures without material structural changes, and has for one of its objects to improve the construction and increase the efficiency and utility of devices of this character.

Another object of the invention is to provide a lock wherein provision is made for employing a plurality of keys all of which are required to be employed to actuate the lock, and thus complicate the device and increase its utility and efficiency.

Figure 1:
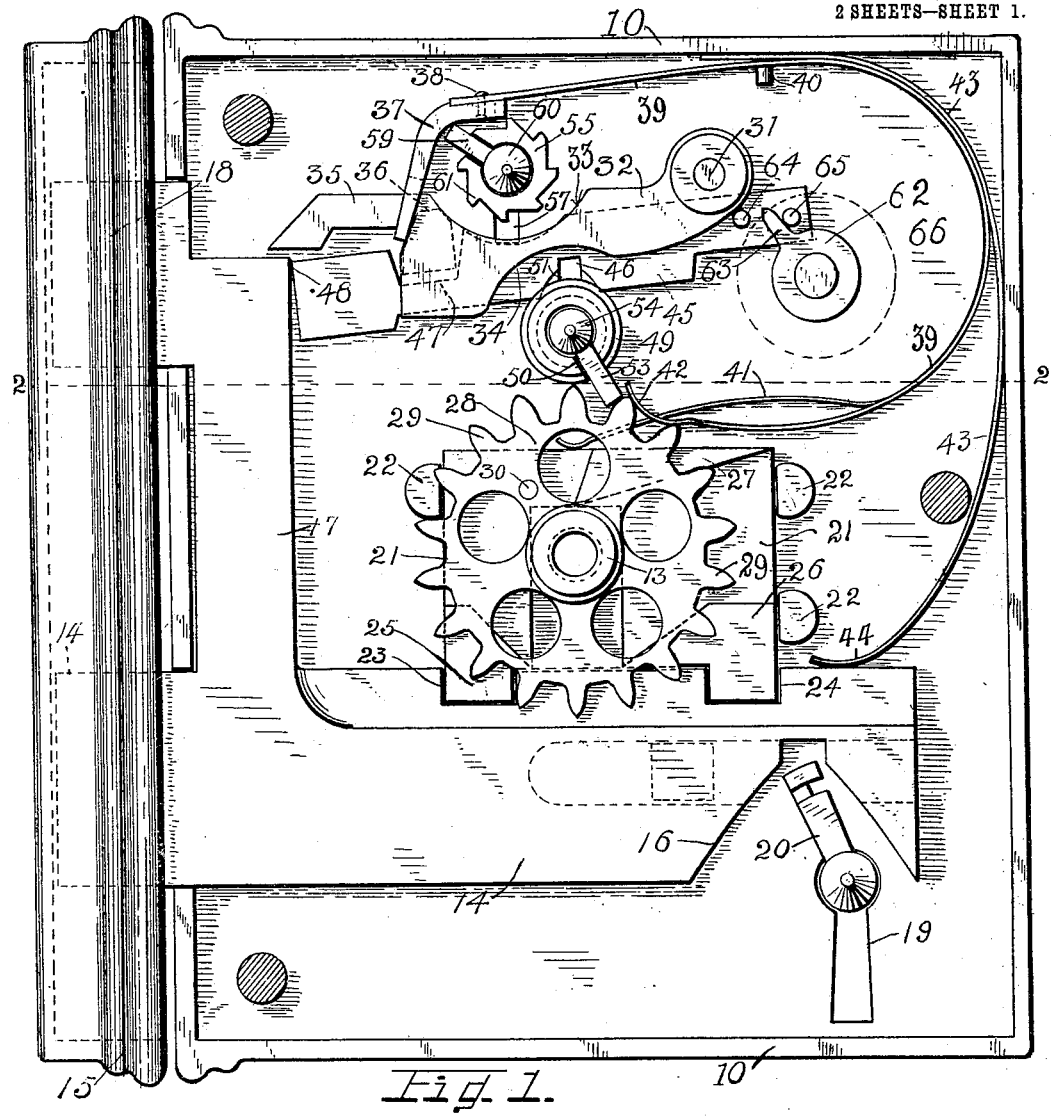
Figure 2:
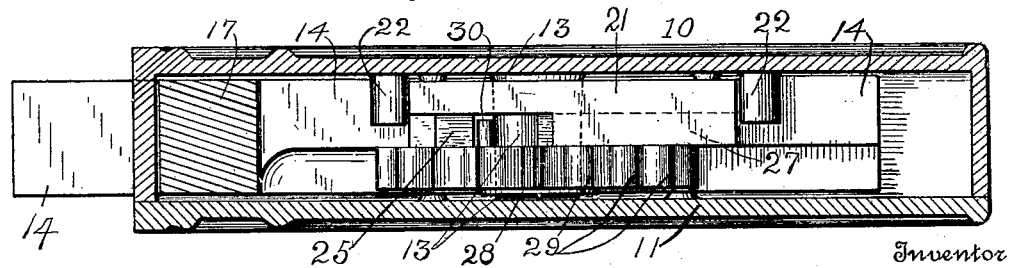

With these and other objects in view, the invention consists in certain novel features of construction as hereinafter shown and described and then specifically pointed out in the claims; and, in the drawings illustrative of the preferred embodiment of the invention, Figure 1 is a side elevation of the improved lock in its preferred form with the cover detached. Fig. 2 is a section on the line 2—2 of Fig. 1. Fig. 3 is a side view on a reduced scale of the improved lock. Fig. 4 is an end view of the lock on the same scale as Fig. 3, partly in section. Fig. 5 is a perspective view of the locking member detached. Fig. 6 is a perspective view of the locking bar detached. Fig. 7 is a perspective view from the opposite side of the trigger member detached. Figs. 8 and 9 are side views of the slotted drums which form a part of the improved device. Fig. 10 is a perspective view of the operating member of the trigger detached. Figs. 11 and 12 are views of two of the keys employed in the improved lock.

The improved device comprises a casing 10 having a detachable cover 11, the cover being secured to the casing by a clamp bolt or screw 12 fitting in a threaded aperture in a stud 13, the latter extending from the bottom member of the casing.

Slidably disposed within the casing 10 is the main bolt 14, the bolt extending through an opening in one side of the casing and fitting into a keeper 15 when the bolt is in projected position, as shown in Fig. 1. The bolt 14 is provided near one end with the usual key-receiving recess 16, and is also provided with an upwardly directed arm 17. At its upper end the arm 17 is provided with a projection 18 which extends through an opening in the side of the casing 10 and enters the keeper 15 when in projected position, as shown in Fig. 1. The projecting portion 18 and the outer end of the bolt 14 thus serve as the holding parts of the bolt member of the lock, and likewise serve as guides to the movement of the bolt, so that it needs no other supports or guides.

A key-hole 19 is formed in the casing 10 adjacent to the recess 16 through which the key, indicated as a whole at 20, is inserted to actuate the bolt 14, as represented in Fig. 1.

Mounted for slidable movement over the stud 13 is a frame-like member 21, and projecting from the casing 10 are guide pins 22 between which the member 21 moves. Formed in the upper edge of the bolt 14 are recesses 23—24 spaced apart and into which projecting portions 25—26 of the member 21 extend when the member 21 is in its downward position, as shown in Fig. 1, and thus lock the bolt 14 in its open or distended position. The member 21 is also provided with an angular projecting portion 27, the object to be hereinafter explained.

Mounted for rotation upon the stud 13 is a disk 28 having a plurality of teeth 29 spaced at uniform distances apart, and likewise provided with a pin 30 projecting inwardly toward the member 21 and adapted to engage the projection 27 when the disk 28 is rotated and thus move the member 21 upwardly and detach the portions 25—26 from engagement with the recesses 23—24 and thus release the bolt 14, as hereinafter explained.

Projecting from the rear member of the casing 10 is a pin 31, and mounted to swing upon this pin is an arm 32, the arm having a recess 33 in its upper side and a recess 34 in its lower side. The arm 32 is also provided with a hook-like terminal 35 at its free end and with a laterally directed lug 36 at the inner end of the hook portion 35, the lug extending toward the back portion of the casing 10. Engaging around the hook-like portion 35 of the arm 32 is another hook-like member 37, extending toward the upper end of the casing and thence laterally and riveted or otherwise secured at 38 to a leaf-spring 39. The spring 39 is conducted around the interior of the casing 10 and is supported in position by a pin 40 projecting from the casing. The spring 39 is forked at its free end to produce two spring portions 41 and 42, the spring 41 bearing upon the member 21 and retaining it yieldably in its downward position, and the portion 42 of the spring bearing against the teeth 29 of the disk 28, and thus hold the latter against accidental displacement, but which will yield to pressure applied to produce rotary movement to the disk, as hereinafter explained. Fitting over the pin 40 between the spring 39 and the adjacent side of the casing 10 is another leaf-spring 43, which extends for engagement by its free end at 44 with the bolt 14, and thus holds the latter yieldably in position, and prevents accidental movement of the latter when in withdrawn position.

Slidably disposed between the arm 32 and the side of the casing 10 is a supplemental bolt or bar, represented as a whole at 45, and provided with a key-receiving recess 46 in its lower edge and a recess 47 in its upper edge to engage around the projecting lug 36 of the arm 32. The free end of the bar 45 bears at 48 against the upwardly directed portion 17 of the bolt 14 when the bar 45 is in its lowermost position, as shown in Fig. 1.

Mounted for rotation in the casing 10 is a drum 49, the drum having bearings at its ends engaging in the rear side of the casing 10 and likewise in the cover 11. The drum 49 serves as a support to the bolt member 45, and limits the latter in its downward movement, as shown. The drum 49 is provided with a longitudinal channel or slot 50 extending from end to end thereof, and formed through the back portion of the casing 10 is a slot 51 communicating with the bearing for the drum 49, while a similar slot 52 is formed in the cover 11 and communicating with the bearing for the drum. The slots 51—52 are designed to communicate with the slot 50 of the drum 49 when the latter is disposed in one position, as shown in Fig. 3, to form a key-way to admit the ward portion 53 of a key 54, as shown in Fig. 1. The ward of the key 54 is adapted to engage with the teeth 29 of the disk 28 to actuate the latter, and likewise to engage in the recess 46 of the bar 45. The member 28 with its teeth 29 is located next to the cover 11, and the bar 45 is located next to the back side of the casing 10 and leaving a considerable space between the two members as shown in Fig. 2, and the ward 53 of the key 54 extends for a relatively short distance longitudinally of the stock of the key, so that when the key is inserted through the cover 11 a relatively short distance the ward 53 will engage the teeth 29, but will not engage in the recess 46 of the bar 45, and then if the key 54 be inserted into the lock to a greater extent the ward 53 will engage in the recess 46 of the bar 45 but will not engage with the teeth 29, the object to be hereinafter explained. Mounted for rotation in suitable bearings in the back portion of the casing 10 and likewise in the cover 11 is another drum 55 having a longitudinal slot 56 in one side and corresponding to and alining with radial slots 57—58 in the casing 10 and the cover 11, the slots 57—58 being similar to the slots 51—52, and designed to admit the ward portion 59 of a key 60. The ward portion 59 of the key 60 is designed to engage beneath the member 37 when rotated and thus elevate the arm 32. The drum 55 is provided with a plurality of ratchet teeth 61 adapted to engage consecutively against the inner end of the member 37, and thus prevent retrograde movement of the drum. Mounted for rotation in the casing 10 near the inner end of the bar 45 is a third drum 62 having a laterally extending arm 63 at one side, the arm designed to operate between pins 64—65 projecting from the bar 45. The drum 62 projects beyond the casing 10 and is provided with a turning disk 66, to enable the arm 63 to be moved between the bars 64—65 and thus forcibly move the bar 45 endwise, as hereinafter explained.

The disk 28 is provided with a certain predetermined number of teeth, and the number of teeth which are formed upon the disk controls the "combination" of the lock, as will be understood. Any required number of teeth may be employed upon the disk, but for the purpose of illustration eighteen teeth are shown, it being thus necessary to rotate the key 54 eighteen times to cause the disk 28 to be rotated one complete revolution, as will be obvious. While eighteen teeth has been shown for the purpose of illustration, it will be understood that the invention is not necessarily limited to any specific number of teeth, but the numbers of the teeth may be varied as required to correspondingly vary and increase the difficulty of opening or operating the lock.

With a lock thus constructed the operation is as follows: It will be understood that the initial position of the wheel 28 is with its pin 30 bearing against the larger end of the stop 27, and the first action of the operator is to manipulate the wheel 28 until the pin 30 is thus located. The key 54 is first inserted and rotated to cause its wards 53 to engage the teeth 29 of the wheel 28. If by rotating the key to the right the wheel 28 is felt to turn with the key then the operator will know that the pin 30 is not properly located against the stop 27, and will continue to rotate the latter until further progress is stopped by the engagement of the pin 30 with the larger end of the stop 27, as above noted. The wheel 28 is thus located at the starting point, so that the operator knows how to control the movements thereafter. The preliminary movement of the key 54 does not affect the bar 45 or arm 32, but leaves the terminal 48 of the bar 45 in engagement with the bolt and retaining the latter in its locked position. The key 54 is then rotated as many complete revolutions as there are teeth 29, save one, which movement will cause the pin 30 to engage the member 27 and elevate the latter and hold the member 21 elevated and out of engagement with the bolt 14. For instance if the disk 28 is provided with eighteen teeth, as shown, the key 54 will be rotated seventeen complete revolutions, which will leave the pin 30 in engagement with the projection 27, and maintain the member 21 in elevated position, as will be obvious. The key 60 is then inserted and rotated half a revolution to cause its ward 59 to actuate the member 37 and thus lift the arm 32 to release the lug 36 from engagement with the bar 45. The knob 66 is then rotated to cause its finger 63 to engage between the pins 64—65 and move the bar 45 endwise to release it from engagement with the bolt 14—17. The key 20 is then inserted and rotated to actuate the main bolt 14. If the lock is to be opened from the inside the knob 66 is actuated as above described, but if the lock is to be opened from the outside, the key 54 is moved inwardly to cause its ward 53 to engage in the recess 46 of the bar 45 and thus actuate the latter, the ward 53 of the key 54 being relatively short to enable this double action of the key 54, as will be understood.

By this arrangement it will be obvious that a simply constructed combined combination and key lock is produced, which requires a previous knowledge of the number of the teeth 29 upon the disk 21 to enable the lock to be actuated, and without this knowledge the lock cannot be opened. The disk 21 being detachable another disk having a different number of the teeth 29 may be mounted for rotation upon the stud, and thus change the combination of the lock.

The improved lock is simple in construction, can be inexpensively manufactured, and readily applied to locks of various sizes and to locks employed for various purposes.

What is claimed is:—

1. In a lock, a main bolt operative by a key, a supplemental bolt engaging said main bolt and holding the same distended when in one position, a trigger device operating to hold said supplemental bolt in locked position relative to said main bolt, a movable locking member engaging said main bolt when in one position, a device adapted to actuate said locking member, another key adapted to actuate said locking member actuating device when in one position and to actuate said supplemental bolt when in another position, and another key adapted to actuate said trigger device.

2. In a lock, a casing having spaced apertures in one edge, a main bolt movably arranged in said casing and extending through one of said apertures and provided with an extension projecting through the other aperture, said main bolt being operative by a key, a supplemental bolt engaging the extension of said main bolt and holding the same distended when in one position, a trigger device operating to hold said supplemental bolt in position relative to said main bolt, another key adapted to operate said trigger device, a movable locking member engaging said main bolt when in one position and another key adapted to operate said supplemental bolt.

3. A lock casing, a main bolt movable in said casing and operative by a key, a locking member provided with a projection and movable in said casing and engaging said main bolt when in one position, a disk having a predetermined number of teeth in its rim and provided with a pin extending therefrom and adapted to engage said projection and disengage said locking member from said bolt when the disk is disposed in one position, and means for actuating said disk.

4. A lock casing, a main bolt movable in said casing and operative by a key, a locking member provided with a projection and movable in said casing and engaging said main bolt when in one position, a disk having a predetermined number of teeth in its rim and provided with a pin extending therefrom and adapted when the disk is disposed in one position to engage said projection and disengage said locking member from said bolt, and a key adapted to operate said disk.

5. In a lock casing, a main bolt movable in said casing and operative by a key, a supplemental bolt engaging said main bolt and holding the same distended when in one position, a locking member provided with a projection and movable in said casing and adapted to engage said main bolt when in one position, a disk having a predetermined number of teeth in its rim and provided with a projecting pin adapted to engage said projection when in one position and disengage said locking member from said bolt, and a key adapted to actuate said disk when in one position and to actuate said supplemental bolt when in another position.

6. In a lock, a main bolt operative by a key, a movable locking member provided with a projection and engaging said main bolt when in one position, a disk having a predetermined number of teeth in its rim and provided with a projecting pin adapted when in one position to engage the projection and disengage the locking member from the main bolt, a supplemental bolt engaging said main bolt and holding the same distended when in one position, a trigger device operating to hold said supplemental bolt in locked position relative to said main bolt, a device adapted to release said trigger from engagement with said supplemental bolt, another key adapted to actuate said toothed disk when in one position and to actuate said supplemental bolt when in another position, and another key operating to actuate said trigger releasing device.

7. In a lock, a casing, a main bolt movable in said casing and operative by a key, a movable locking member provided with a projection and engaging said main bolt when in one position, a disk having a predetermined number of teeth and provided with a projecting pin adapted when in one position to engage the projection and disengage the locking member from the main bolt, a supplemental bolt engaging said main bolt and holding the same distended when in one position, a trigger device operating to hold said supplemental bolt in locked position relative to said main bolt, a spring actuated arm engaging said trigger device, a drum having radial teeth and engaging said arm and operating to prevent retrograde movement thereof, another key adapted to actuate said toothed disk when in one position and adapted to actuate said supplemental bolt when in another position, and another key adapted to actuate said toothed drum.

8. In a lock, a casing, a main bolt movable in said casing and operative by a key, a movable locking member provided with a projection and engaging said main bolt when in one position, a disk having a predetermined number of teeth and provided with a projecting pin adapted when in one position to engage the projection and disengage the locking member from the main bolt, a supplemental bolt engaging said main bolt and holding the same distended when in one position, a trigger device operative to hold said supplemental bolt in locked position relative to said main bolt, an arm engaging said trigger device, a spring supported within said casing and connected at one end to said arm and with the other end forked, one of the forked portions of the spring being yieldably engaged with said disk and the other forked portion being yieldably engaged with said locking member, another key adapted to actuate said toothed disk when in one position and to actuate said supplemental bolt when in another position, and another key adapted to actuate said toothed drum and arm.

9. In a lock, a casing having an internal projecting stud, a main bolt movable in said casing and operative by a key, a locking member provided with a projection and having a recess engaging over said stud and adapted to engage said main bolt when in one position, a disk having peripheral teeth and mounted for rotation upon said stud and provided with a projecting pin adapted to engage said projection and actuate said locking member when in one position, and a key adapted to operate said disk.

10. In a lock, a casing having an internal projecting stud, a main bolt movable in said casing and operative by a key, a locking member provided with a projection and having a recess engaging over said stud and adapted to engage said main bolt when in one position, a disk having peripheral teeth and mounted for rotation upon said stud and provided with a projecting pin adapted to engage said projection and actuate said locking member when in one position, a supplemental bolt engaging said bolt and holding the same distended when in one position, and a key adapted to actuate said disk when in one position and to actuate said supplemental bolt when in another position.

In testimony whereof, I affix my signature, in presence of two witnesses.

JAMES W. HUNTER.

Witnesses:
 THOMAS ARNOLD,
 GEORGE L. HUNTER.